US012679006B2

(12) United States Patent

Dahlgren et al.

(10) Patent No.: US 12,679,006 B2

(45) Date of Patent: Jul. 14, 2026

(54) EMBOSSED RELEASE FILM, VACUUM BAGGING SYSTEM, AND METHODS OF FABRICATING COMPOSITE PARTS USING THE SAME

(71) Applicant: Airtech International, Inc., Huntington Beach, CA (US)

(72) Inventors: Jeffrey L. Dahlgren, Brentwood, TN (US); Philip A. Lunn, Warwick (GB); Zachary I. Skelton, Laguna Hills, CA (US)

(73) Assignee: Airtech International, Inc., Huntington Beach, CA (US)

( * ) Notice: Subject to any disclaimer, the term of this patent is extended or adjusted under 35 U.S.C. 154(b) by 0 days.

(21) Appl. No.: 17/182,696

(22) Filed: Feb. 23, 2021

(65) Prior Publication Data

US 2022/0266479 A1 Aug. 25, 2022

(51) Int. Cl.
　　*B29C 33/68* (2006.01)
　　*B29C 33/62* (2006.01)
　　*B29C 41/50* (2006.01)

(52) U.S. Cl.
　　CPC .............. *B29C 33/68* (2013.01); *B29C 33/62* (2013.01); *B29C 41/50* (2013.01)

(58) Field of Classification Search
　　CPC ........ B29C 70/544; B29C 41/50; B29C 33/68
　　See application file for complete search history.

(56) References Cited

U.S. PATENT DOCUMENTS

| | | | | |
|---|---|---|---|---|
| 4,548,859 A | * | 10/1985 | Kline | ..................... D06N 3/128 |
| | | | | 428/447 |
| 4,614,632 A | * | 9/1986 | Kezuka | ................... B29C 51/22 |
| | | | | 425/363 |
| 5,129,813 A | * | 7/1992 | Shepherd | ............ B32B 37/1018 |
| | | | | 156/286 |
| 5,807,593 A | * | 9/1998 | Thompson | .............. B29C 70/44 |
| | | | | 425/389 |
| 6,017,484 A | * | 1/2000 | Hale | ..................... B29C 70/342 |
| | | | | 156/286 |
| 9,994,008 B2 | | 6/2018 | Coxon et al. | |

OTHER PUBLICATIONS

Durret, Jérôme, Pierre-David Szkutnik, Nathalie Frolet, Sebastien Labau, and Cécile Gourgon. "Superhydrophobic polymeric films with hierarchical structures produced by nanoimprint (NIL) and plasma roughening." Applied Surface Science 445 (2018): 97-106. (Year: 2018).*

(Continued)

*Primary Examiner* — Matthew J Daniels

(74) *Attorney, Agent, or Firm* — Norton Rose Fulbright US LLP

(57) ABSTRACT

An embossed release film for use in a vacuum bagging system during a process of curing a composite part includes a raised pattern defining an upper air pathway and a lower air pathway. The raised pattern defining the upper air pathway and the lower air pathway negates the need for a breather fabric that is included in conventional vacuum bagging systems. Providing a vacuum bagging system without a breather fabric simplifies the vacuum bagging system, satisfies lean manufacturing principles, and reduces cycle time, manufacturing cost, and waste.

7 Claims, 2 Drawing Sheets

(56) References Cited

OTHER PUBLICATIONS

Salehi-Schneider, S., F. Grimm, A revolutionary auxiliary film development for composite manufacturing, Reinforced Plastics, vol. 62, No. 2 (Mar./Apr. 2018), pp. 97-100. (Year: 2018).*

SalehiSchneider (Year: 2018).*

Extended European Search Report for Application No. 22158182.0, mailed Jul. 12, 2022, 6 pages.

"Embossed release-agent ED—Miracle & S L Donaldson D B", Composites, IPC Business Press Ltd. Haywards Heath, GB, vol. 5, No. 6, Nov. 1, 1974, pp. 238-239.

Miracle D B et al: "Curing", Jan. 1, 2001, ASM Handbook / Prepared Under the Direction of the ASM International Handbook Committee, ASM International, Materials Park, Ohio , USA, pp. 486-491.

Canadian Examiner's Report for Application No. 3,149,950, mailed Feb. 13, 2023, 3 pages.

* cited by examiner

EMBOSSED RELEASE FILM, VACUUM BAGGING SYSTEM, AND METHODS OF FABRICATING COMPOSITE PARTS USING THE SAME

FIELD

Aspects of the present disclosure relate generally to an embossed release film for use in a vacuum bagging process during the fabrication of a composite part.

BACKGROUND

Advanced composite parts typically include layers of fibrous materials bonded together with a matrix of polymer (i.e., a resin). Fabrication of composite parts typically includes laying up fibers on a mold. The lay-up process may be performed either by manually laying up prepreg fabric (i.e., fibrous materials that are pre-impregnated with the matrix material) or the lay-up process may be performed automatically using an automated tape layup (ATL) or an automated fiber placement (AFP) process. When a one-sided mold is utilized, conventional fabrication techniques utilize a vacuum bagging system (known as a compaction or debulk vacuum bag) to press the fibrous layers onto the mold, remove trapped air between the layers, and achieve the desired fiber-to-resin ratio such that the composite part exhibits the desired laminate properties (e.g., strength, weight, and stiffness).

Conventional vacuum bagging systems typically include a peel ply on the fibrous layers that are to be consolidated into the composite part, a release film on the peel ply, a breather/bleeder fabric on the release film, and a vacuum bag film on the breather/bleeder fabric that is sealed along its edges to the mold with sealant tape. The peel ply may be omitted in some instances. Conventional vacuum bagging systems also includes a vacuum pump connected to a port in the vacuum bag that is configured to withdraw the air out of the interior space between the vacuum bag film and the mold. The breather/bleeder fabric is a relatively thick non-woven fabric configured to provide an escape path for air being withdrawn from the interior space. The breather/bleeder fabric is also configured to absorb any excess resin that bleeds out the fibrous layers as they are compressed by the vacuum bag film. The release film is included to allow the bagging materials to be removed after cure from the fabricated composite component.

The cure of the resin can take place in an oven with vacuum bag pressure only. Alternatively, the resin can be cured at an elevated temperature and elevated pressure in an autoclave to achieve a higher degree of consolidation of the fibrous layers. The cure may also occur via a catalyst, either with or without the application of an elevated temperature.

The numerous layers of these conventional vacuum bagging systems increases the manufacturing cost, cycle time, and waste associated with fabricating composite parts.

SUMMARY

The present disclosure relates to various embodiments of an embossed release film for use in a vacuum bagging system during a process of curing a composite part. In one embodiment, the embossed release film includes a raised pattern defining an upper air pathway and a lower air pathway. The embossed release film may include a polyolefin or a fluoropolymer material. A release-coating may be on at least a portion of an inner surface of the embossed release film.

The present disclosure is also directed to various embodiments of a vacuum bagging system for use during a process of curing a composite part. In one embodiment, the vacuum bagging system includes an embossed release film including a raised pattern defining an upper air pathway and a lower air pathway, a vacuum bag film configured to cover the embossed release film, a tape sealant configured to seal the vacuum bag film to a mold, a valve in communication with an interior space between the embossed vacuum bag film and the mold, and a hose coupled to the valve. In some embodiments, the raised pattern defining the upper air pathway and the lower air pathway negates the need for a breather fabric that is included in conventional vacuum bagging systems. Accordingly, in one embodiment, the vacuum bagging system does not include a breather fabric, which simplifies the vacuum bagging system, satisfies lean manufacturing principles, and reduces cycle time, manufacturing cost, and waste. The embossed release film may include a polyolefin or a fluoropolymer material. A release-coating may be on at least a portion of an inner surface of the embossed release film.

The present disclosure is also directed to various methods of fabricating a composite part. In one embodiment, the method includes loading a fibrous material of an uncured composite part on a mold, and curing the uncured composite part to form the composite part. Curing the uncured composite part includes placing the uncured composite part in a vacuum bagging system and placing the vacuum bagging system and the uncured composite part in an oven or an autoclave. Placing the uncured composite part in the vacuum bagging system includes placing an embossed release film on the uncured composite part, covering the uncured composite part and the embossed release film with a vacuum bag film, and sealing the vacuum bag film to the mold. The embossed release film includes a raised pattern defining an upper air pathway and a lower air pathway. The method also includes evacuating air from an interior space between the vacuum bag film and the mold utilizing a vacuum pump of the vacuum bagging system. During the task of evacuating the air from the interior space, air flows through the upper air pathway and the lower air pathway defined by the embossed release film. Additionally, the vacuum bagging system utilized during the task of curing the composite part does not include a breather fabric, which simplifies the vacuum bagging system, satisfies lean manufacturing principles, and reduces cycle time, manufacturing cost, and waste.

The method also includes removing the composite part from the vacuum bagging system. The embossed release film self-releases from the composite part during the task of removing the composite part from the vacuum bagging system.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable embossed release film, a vacuum bagging system, or a method of fabricating a composite part.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of an embossed release film, a vacuum bagging system including an embossed release film for use in curing composite parts, and various methods of fabricating a composite part using a vacuum bagging system including an embossed release film during a task of curing the composite part. The embossed release film defines air pathways configured to facilitate the removal of the air and/or volatiles inside the interior of the vacuum bag during a vacuum sealing operation, which mitigates against the formation of defects in the fabricated composite part. Additionally, in some embodiments, the embossed release film negates the need for a breather fabric that is included in a conventional vacuum bagging system, which simplifies the present vacuum bagging system and the present method of curing the composite part with the vacuum bagging system, satisfies lean manufacturing principles, and reduces cycle time, manufacturing cost, and waste.

Figure 1:
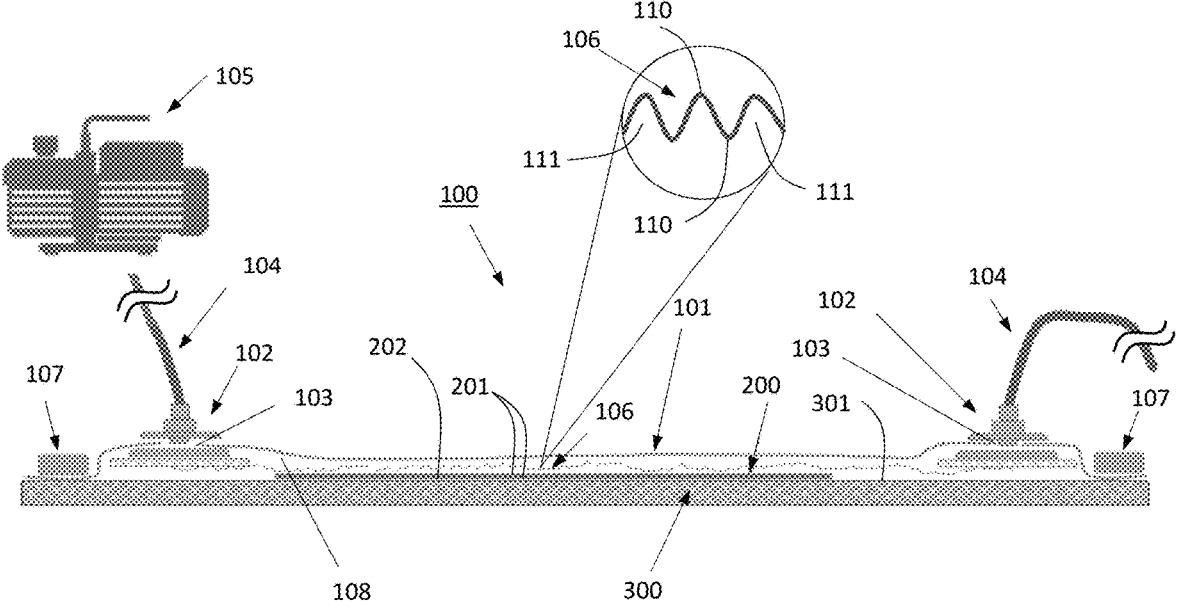
FIG. 1 is a cross-sectional view of a vacuum bagging system including a self-releasing embossed release film according to one embodiment of the present disclosure.

FIG. 1 depicts a vacuum bagging system 100 according to one embodiment of the present disclosure for use in curing a composite part 200 on a mold surface 301 of a mold 300 during a process of fabricating the composite part 200. Although in the illustrated embodiment the mold surface 301 is flat (e.g., planar), in one or more embodiments the mold surface 301 may have any shape depending on the desired shape of the composite part 200. For instance, in one or more embodiments, the mold surface 301 may have a simple curvature or a compound curvature.

The composite part 200 being fabricated includes fibrous materials 201 (e.g., layers or plies of fabric or fibrous materials) bonded together with a matrix of polymer 202 (e.g., a resin material) and arranged in a laminate stack. Suitable fibrous materials include, but are not limited to, carbon, fiberglass, aramid, and quartz. Suitable matrix materials include, but are not limited to, epoxy, polyester, vinyl esters, bismaleimids (BMI), and/or benzoxazine. The fibrous materials 201 may be pre-impregnated with the matrix material 202 in the form of a prepreg fabric that was manually placed on the mold surface 301 of the mold 300 or in the form of tape or tow that was placed on the mold surface 301 of the mold 300 automatically with a machine (e.g., an automated tap layup (ATL) or an automated fiber placement (AFP) machine). During the process of fabricating the composite part 200, the fibrous materials are pressed together such that the composite part 200 achieves the form of the mold surface 301 of the mold 300 and the composite part 200 has the desired fiber-to-matrix ratio and the desired laminate properties of the composite part 200 (e.g., strength, weight, and/or stiffness).

In the illustrated embodiment, the vacuum bagging system 100 includes a vacuum bag film 101, one or more vacuum valves 102 received in one or more openings or ports 103 in the vacuum bag film 101, one or more vacuum hoses 104 connected to the one or more vacuum valves 102, a vacuum pump 105 connected to the one or more vacuum hoses 104, an embossed release film 106 between the composite part 200 being fabricated and the vacuum bag film 101, and a sealant 107 (e.g., a vacuum sealant tape) sealing the vacuum bag film 101 to the mold 300. Although in the illustrated embodiment the one or more vacuum ports 103 and the one or more vacuum valves 102 are provided in the vacuum bag film 101, in one or more embodiments, the one or more vacuum ports 103 and the one or more vacuum valves 102 may be provided in the mold 300. The vacuum bagging system 100 may include a single vacuum bag film 101 or the vacuum bagging system 100 may include two or more vacuum bag films 101 the edges of which overlap each other and are sealed together with sealant tape (e.g., the vacuum bagging system 100 may include a single vacuum bag film 101 or multiple vacuum bag films 101 with overlapping sealant tape joints). The vacuum bag film 101 covers an upper surface of the composite part 200 being fabricated, and together the vacuum bag film 101, the sealant 107, and the mold 300 define an interior chamber 108 in which the composite part 200 being fabricated and the embossed release film 106 are accommodated. The one or more vacuum hoses 104 and the one or more vacuum valves 102 are in fluid communication with the interior chamber 108 and are configured to withdraw the air from the interior chamber 108. Additionally, in the illustrated embodiment, the vacuum bagging system 100 does not include a breather fabric (e.g., the embossed release film 106 negates the need for a breather fabric that is included in a conventional vacuum bagging system). Eliminating the breather fabric simplifies the vacuum bagging system 100, satisfies lean manufacturing principles, and reduces cycle time, manufacturing cost, and waste.

The embossed release film 106, which is configured to contact the upper surface of the uncured composite part 200 during a task of curing the uncured composite part 200 using the vacuum bagging system 100, may be formed of any suitable material or materials such that the embossed release film 106 is configured to self-release from the composite part 200 after it has been fabricated using the vacuum bagging system 100. For instance, in one or more embodiments, the embossed release film 106 may be formed of any suitable polymer, such as a polyolefin and/or a fluoropolymer material. Suitable polyolefins for the embossed release film 106 include polymethyl pentene, polypropylene, polyethylene, or combinations or alloys thereof. Suitable fluoropolymers for the embossed release film 106 include PTFE (polytetrafluoroethylene), PFA (perfluoroalkoxy polymer), FEP (fluorinated ethylene-propylene), ETFE (polyethylenetetrafluoroethylene) or combinations or alloys thereof. Additionally, in one or more embodiments, the polyolefins and/or the fluoropolymers of the embossed release film 106 may be combined with one or more colorants and/or additives. Accordingly, in one or more embodiments, one or more materials of the embossed release film 106 may be selected depending on the materials of the composite part 200 (e.g., the material of the fibers 201 and/or the matrix 202). Furthermore, in one or more embodiments, a release-coating is on at least a portion of an inner surface of the embossed release film 106 facing toward the composite part 200. The release-coating may be formed of any suitable material(s) configured to release from the composite part 200 and the material(s) of the release-coating may be selected depending, at least in part, on the composition of the matrix material 202 of the composite part 200.

The embossed release film 106 includes a raised pattern 109 projecting outward (e.g., upward) toward the vacuum bag film 101 and downward toward the composite part 200 being fabricated. The raised pattern 109 of the embossed release film 106 defines upper and lower air pathways 110, 111 (i.e., dual air pathways), respectively. The upper air pathway 110 is between the embossed release film 106 and the vacuum bag film 101, and the lower air pathway 111 is between the embossed release film 106 and the composite part 200 being formed. In one or more embodiments, the raised pattern 109 may be formed in a regular, repeating arrangement or in an irregular arrangement (e.g., a random arrangement). Accordingly, in one or more embodiments, the upper and lower air pathways 110, 111 may be uniform across the embossed release film 106 or the upper and lower air pathways 110, 111 may vary in size and/or shape across the embossed release film 106. During the process of removing the air from the interior chamber 108 with the one or more valves 102, the one or more hoses 104, and the vacuum pump 105, the upper and lower air pathways 110, 111 defined in the embossed release film 106 are configured facilitate the removal of the air and/or volatile materials inside the interior chamber 108. For instance, the one or more embodiments, the upper and lower air pathways 110, 111 are configured to mitigate against the formation of pockets in the embossed release film 106 and/or the vacuum bag film 101 in which trapped air and/or volatiles cannot be evacuated (e.g., if pockets or bubbles/rippling form in the vacuum bag film 101 and/or the embossed release film 106 during the process of removing the air and/or volatile materials from the interior chamber 108, the upper and lower air pathways 110, 111 defined by the raised pattern 109 of the embossed release film 106 permit the removal of air and/or volatile materials trapped inside these pockets or bubbles). In one or more embodiments, the upper and lower air pathways 110, 111 defined by the raised pattern 109 of the embossed release film 106 allow for the complete or substantially complete removal of the air and/or volatile materials inside the interior chamber 108. Complete or substantially complete removal of the air and/or volatile materials from the interior chamber 108 is important to avoiding the formation of defects in the fabricated composite part 200.

Figure 2:
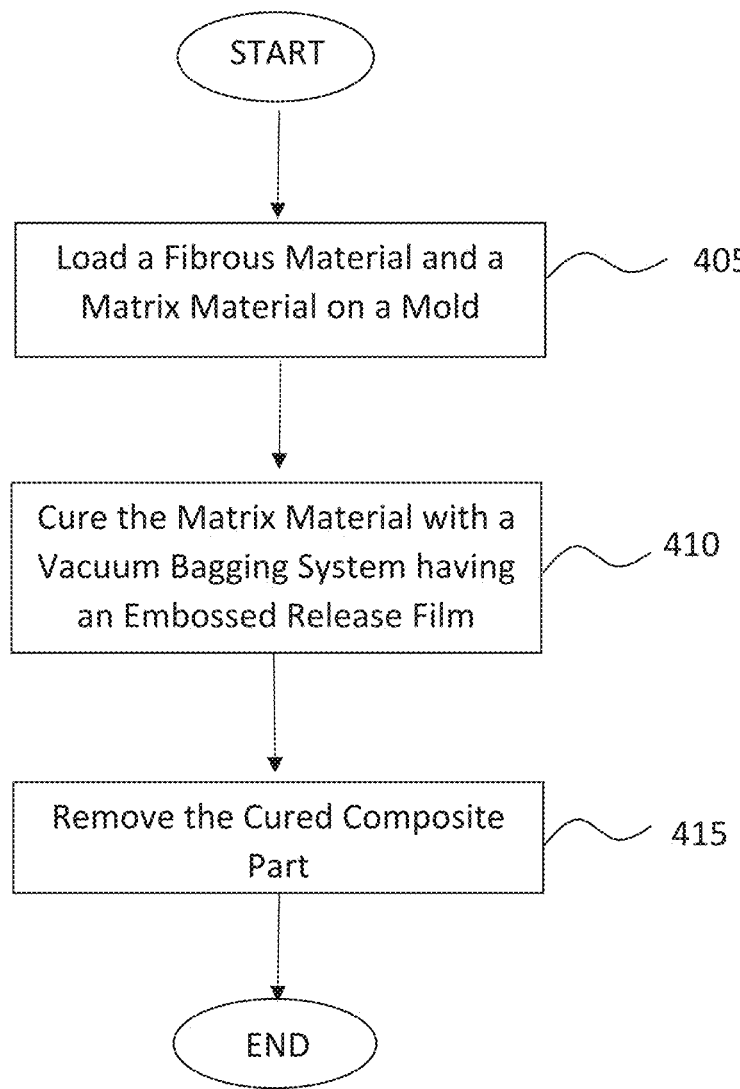
FIG. 2 is a flowchart illustrating tasks of a method of fabricating a composite part according to one embodiment of the present disclosure.

FIG. 2 is a flowchart illustrating tasks of a method 400 of fabricating a composite part utilizing the vacuum bagging system 100 described above according to one embodiment of the present disclosure. In the illustrated embodiment, the method 400 includes a task 405 of loading or placing a fibrous material (e.g., fabric plies) and a matrix material (e.g., a resin) on a mold surface of a mold (e.g., mold 300 shown in FIG. 1) having the desired shape (e.g., planar, simple curvature, or compound curvature) of the composite part. The task 405 of loading the fibrous material and the matrix material on the mold may be performed in any suitable manner known in art or hereinafter developed. In one embodiment, the plies of fibrous materials may be pre-impregnated with the matrix material in the form of a prepreg fabric, and the task 405 may include manually placing the prepreg fabric on the mold (i.e., performing a manual layup of the fibrous layers on the mold). In one or more embodiments, the task 405 may include automatically placing tape or tow (e.g., carbon fiber threads) on the mold utilizing a machine (e.g., the task 405 may include an automated tap layup (ATL) or automated fiber placement (AFP) process). Following the task 405 of placing the plies of fibrous material and the matrix material, the plies are arranged in a laminate stack on the mold.

In the illustrated embodiment, the method 400 also includes a task 410 of curing the matrix material (e.g., the resin) in the fibrous materials that were laid up on the mold in task 405. In one or more embodiments, the task 410 of curing the matrix material includes placing the uncured composite part (e.g., the fibrous material bonded together with the resin) inside the vacuum bagging system 100 depicted in FIG. 1. Accordingly, in the illustrated embodiment, the task 410 of curing the matrix material includes placing the embossed release film 106 on an upper surface of the fibrous material (which is bonded together with the matrix material) that were placed in task 405, covering the embossed release film 106 and the fibrous material with the vacuum bag film 101 having one or more valves 102 and hoses 104 connected to the one or more openings or ports 103 in the embossed vacuum bag film 101, and sealing the vacuum bag film 101 to the mold with the sealant 107 (e.g., the vacuum sealant tape), as shown for example in FIG. 1. In one or more embodiments, the task 410 of curing the composite part utilizing the vacuum bagging system 100 may not include placing a breather layer on the fibrous material (e.g., the upper and lower air pathways 110, 111 in the embossed release film 106 negate the need for using a breather fabric that is utilized in conventional vacuum bagging processes). Eliminating the breather fabric simplifies the method 400 of fabricating the composite part, satisfies lean manufacturing principles, and reduces cycle time, manufacturing cost, and waste.

In one or more embodiments, the task 410 of curing the resin may be initiated by a catalyst or hardener additive premixed into the resin, and the curing may occur at room temperature. In one or more embodiments, the task 410 of curing the matrix material includes placing the vacuum bagging system 100 (and the uncured composite part therein) inside an oven generating an elevated temperature, or inside an autoclave generating an elevated temperature and an elevated pressure, and activating the vacuum pump 105 connected to the one or more hoses 104 to withdraw air from the interior chamber 108 of the vacuum bag film 101 in which the fibrous material is positioned. Activating the vacuum pump 105 of the vacuum bagging system 100 during the task 410 of curing the resin holds the composite part in position on the mold, further consolidates the fibrous material, contains the resin where it is required, and withdraws off-gassing from the resin that occurs as the matrix cures. Curing the composite part in an autoclave may result in a greater degree of compaction of the composite part compared to a composite part in which the resin was cured in an oven or at room temperature.

As described above, the embossed release film 106 includes a raised pattern 109 defining upper and lower air pathways 110, 111 between the embossed release film 106 and the vacuum bag film 101 and between embossed release film 106 and the composite part being formed, respectively. During the task 410 curing the composite part, which includes placing the uncured composite part in the vacuum bagging system 100 and activating the vacuum pump 105, air and/or volatile materials generated during off-gassing from the resin flow through the upper and lower air pathways 110, 111 and are removed from the interior chamber 108. For instance, in one or more embodiments, the upper and lower air pathways 110, 111 are configured to mitigate against the formation of pockets in the vacuum bag film 101 and/or the embossed release film 106 in which trapped air and/or volatiles cannot be evacuated (e.g., if pockets or bubbles/rippling form in the vacuum bag film 101 and/or the embossed release film 106 during the task 410 of curing the composite part, the upper and lower air pathways 110, 111 defined by the raised pattern 109 of the embossed release film 106 permit the removal of the air and/or volatile materials trapped inside these pockets or bubbles). In one or more embodiments, the upper and lower air pathways 110, 111 defined by the raised pattern 109 of the embossed release film 106 allow for the complete or substantially complete removal of the air and/or volatile materials inside the interior chamber 108 during the task 410 of curing the composite part. Complete or substantially complete removal of the air and/or volatile materials from the interior chamber 108 mitigates against the formation of defects in the fabricated composite part.

In the illustrated embodiment, the method 400 also includes a task 415 of removing the cured composite part from the interior chamber 108 of the vacuum bagging system 100. As described above, the embossed release film 106, which contacts the upper surface of the composite part, may be formed of any suitable material (e.g., a polymer, such as a polyolefin or a fluoropolymer) such that the embossed release film 106 is configured to self-release from the cured composite part after it has been fabricated using the vacuum bagging system 100, which facilitates removal of the composite part in task 415.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures, methods of manufacture, and methods of application can be practiced without meaningfully departing from the principles, spirit, and scope of this invention.

Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another layer or structure, it can be directly on the other layer or structure or intervening layer(s) and/or structures(s) may be present therebetween.

The tasks described above may be performed in the order described or in any other suitable sequence. Additionally, the methods described above are not limited to the tasks described. Instead, for each embodiment, one or more of the tasks described above may be absent and/or additional tasks may be performed.

What is claimed is:

1. A method of fabricating a composite part, the method comprising:

loading a fibrous material of an uncured composite part on a mold;

curing the uncured composite part to form the composite part, wherein the curing the uncured composite part comprises placing the uncured composite part in a vacuum bagging system and placing the vacuum bagging system and the uncured composite part in an oven or an autoclave, wherein the curing generates volatile compounds due to off-gassing of resin in the composite part, wherein the placing the uncured composite part in the vacuum bagging system comprises:

placing an embossed release film on the uncured composite part, the embossed release film comprising a raised pattern having an irregular arrangement and defining a plurality of pathways extending across the embossed release film;

covering the uncured composite part and the embossed release film with a vacuum bag film; and sealing the vacuum bag film to the mold; and evacuating air and the volatile compounds from an interior space between the vacuum bag film and the mold through one or more vacuum ports in communication with interior space utilizing a vacuum pump of the vacuum bagging system during the curing of the uncured composite part, wherein the air and the volatile compounds flow across the embossed vacuum bag film through the plurality of air pathways defined by the embossed release film during the evacuating of the air and the volatile compounds from the interior space; and removing the composite part from the vacuum bagging system, wherein the embossed release film self-releases from the composite part, wherein the vacuum bagging system does not include a breather fabric, wherein the embossed release film crosses the one or more vacuum ports in a plan view, and wherein a size and the shape of the plurality of air pathways vary across the embossed release film.

2. The method of fabricating a composite part of claim 1, wherein the embossed release film comprises a polyolefin or a fluoropolymer material.

3. The method of fabricating a composite part of claim 1, wherein the embossed release film further comprises a release-coating on at least a portion of an inner surface of the embossed release film.

4. The method of fabricating a composite part of claim 1, wherein sealing the vacuum bag film to the mold comprises sealing the vacuum bag film to the mold with a tape sealant.

5. The method of fabricating a composite part of claim 1, wherein the fibrous materials further comprise layers or plies of fabric or fibrous materials bonded together with a matrix of polymer and arranged in a laminate stack.

6. The method of fabricating a composite part of claim 5, wherein the layers or plies of fabric or fibrous materials comprise carbon, fiberglass, aramid, or quartz.

7. The method of fabricating a composite part of claim 5, wherein the matrix of polymer comprises epoxy, polyester, vinyl esters, bismaleimides, or benzoxazine.

* * * * *